US010439996B2

(12) United States Patent
Puri et al.

(10) Patent No.: US 10,439,996 B2
(45) Date of Patent: Oct. 8, 2019

(54) METHOD AND SYSTEM FOR METADATA ANALYSIS AND COLLECTION WITH PRIVACY

(71) Applicant: Yaana Technologies, LLC, Milpitas, CA (US)

(72) Inventors: Rajesh Puri, Fremont, CA (US); David Grootwassink, Safety Harobor, FL (US); Michael P. Hammer, Reston, VA (US)

(*) Notice: Subject to any disclaimer, the term of this patent is extended or adjusted under 35 U.S.C. 154(b) by 0 days.

(21) Appl. No.: 14/620,024

(22) Filed: Feb. 11, 2015

(65) Prior Publication Data

US 2015/0229617 A1  Aug. 13, 2015

Related U.S. Application Data

(60) Provisional application No. 61/938,685, filed on Feb. 11, 2014.

(51) Int. Cl.
*H04L 9/00* (2006.01)
*H04L 29/06* (2006.01)
*G06F 21/62* (2013.01)

(52) U.S. Cl.
CPC ...... *H04L 63/0435* (2013.01); *G06F 21/6272* (2013.01); *H04L 63/0407* (2013.01); *H04L 63/062* (2013.01)

(58) Field of Classification Search
CPC ............. H04L 63/0435; H04L 63/0407; H04L 63/062; G06F 21/6272
(Continued)

(56) References Cited

U.S. PATENT DOCUMENTS 6,266,704 B1   7/2001  Reed
6,377,688 B1   4/2002  Numao
(Continued)

FOREIGN PATENT DOCUMENTS

CN   103838593   6/2014
CN   104869181   8/2015
(Continued)

OTHER PUBLICATIONS

"Interface for warrant information Output From LI34 Q & D LI Agnostic;LI(14)P35060_DTS_103_120_-_Output_from_LI_13_Q_D_LI_agnostic", ETSI Draft; LI(14)P35060_DTS_103_120_-_Output_From_LI_13_Q_D_LI_Agnostic, European Telecommunications Standards Institute (ETSI), 650, Route Des Lucioles ; F-06921 Sophia-Antipolis ; France, (20140128), vol. LI, No. V0.0. 7, pp. 1-53, XP014161420.
(Continued)

*Primary Examiner* — Alexander Lagor
(74) *Attorney, Agent, or Firm* — Goodwin Procter LLP (57) ABSTRACT

A system and method for metadata analysis and collection with privacy is disclosed. According to one embodiment, a trusted third party (TTP) system generates and transmits authorization keys to a government agency (GA) system and a communication service provider (CSP) system. The TTP system receives index records referencing records of subscribers from the CSP system and ingests the index records received from the CSP system. The TTP system receives a target index request from the GA system and sends a metadata record request to the CSP system based on the target index request. The CSP system sends metadata records to the TTP system, and the TTP system delivers the metadata records to the GA system. The metadata records are encrypted with encryption keys shared between the GA
(Continued)

system and the CSP system such that the TTP system cannot decrypt the metadata records.

22 Claims, 6 Drawing Sheets

(58) Field of Classification Search
USPC .............................................. 713/171; 726/26
See application file for complete search history.

(56) References Cited

U.S. PATENT DOCUMENTS

| | | |
|---|---|---|
| 6,529,441 B1 | 3/2003 | Cummins |
| 6,574,609 B1 | 6/2003 | Downs et al. |
| 6,765,892 B1 | 7/2004 | Leung |
| 6,785,740 B1 | 8/2004 | Yoneda |
| 6,990,352 B2 | 1/2006 | Pyhaelammi |
| 7,082,532 B1 | 7/2006 | Vick |
| 7,146,009 B2 | 12/2006 | Andivahis |
| 7,383,433 B2 | 6/2008 | Yeager |
| 7,536,464 B1 | 5/2009 | Dommety |
| 7,561,517 B2 | 7/2009 | Klinker |
| 7,620,033 B2 | 11/2009 | Chu |
| 7,634,522 B1 | 12/2009 | Carter |
| 7,653,815 B2 | 1/2010 | Godfrey |
| 7,739,496 B2 | 6/2010 | Jacobs |
| 7,783,901 B2 | 8/2010 | Carrico |
| 7,796,760 B2 | 9/2010 | Brettle |
| 7,809,943 B2 | 10/2010 | Seidel |
| 7,849,053 B2 | 12/2010 | Wolff |
| 7,961,663 B2 | 6/2011 | Lin |
| 7,966,000 B2 | 6/2011 | Semple |
| 7,969,968 B2 | 6/2011 | De Luca |
| 7,991,158 B2 | 8/2011 | Narendra |
| 8,068,606 B2 | 11/2011 | Schneider |
| 8,149,994 B2 | 4/2012 | Yoon |
| 8,195,147 B2 | 6/2012 | Bonnet |
| 8,218,490 B2 | 7/2012 | Rydnell |
| 8,264,989 B2 | 9/2012 | Suzuki |
| 8,275,891 B2 | 9/2012 | Yasrebi |
| 8,295,830 B1 | 10/2012 | Faccin |
| 8,311,956 B2 | 11/2012 | Sen |
| 8,363,664 B2 | 1/2013 | Ramankutty |
| 8,417,224 B1 | 4/2013 | Young |
| 8,452,957 B2 | 5/2013 | Pourzandi |
| 8,472,384 B2 | 6/2013 | Shu |
| 8,516,244 B2 | 8/2013 | Waters |
| 8,560,835 B2 | 10/2013 | Johansson |
| 8,599,747 B1 | 12/2013 | Saleem |
| 8,634,810 B2 | 1/2014 | Barkie |
| 8,646,063 B2 | 2/2014 | Dowlatkhah |
| 8,667,182 B2 | 3/2014 | Huang |
| 8,667,570 B2 | 3/2014 | Bari |
| 8,677,148 B2 | 3/2014 | O'Hare |
| 8,713,320 B2 | 4/2014 | Xu |
| 8,738,898 B2 | 5/2014 | Herwono |
| 8,738,916 B2 | 5/2014 | Klassen |
| 8,755,342 B2 | 6/2014 | Iyer |
| 8,755,370 B1 | 6/2014 | Biswas |
| 8,755,392 B2 | 6/2014 | Traversat |
| 8,811,401 B2 | 8/2014 | Stroud |
| 8,831,227 B2 | 9/2014 | Ge |
| 8,867,339 B2 | 10/2014 | Hu |
| 8,891,407 B2 | 11/2014 | Collins |
| 8,924,574 B2 | 12/2014 | Alex |
| 8,996,854 B2 | 3/2015 | Hamalainen |
| 9,013,992 B2 | 4/2015 | Perkins |
| 9,036,540 B2 | 5/2015 | Bu |
| 9,047,107 B2 | 6/2015 | Walsh |
| 9,172,703 B2 | 10/2015 | Chaturvedi |
| 9,191,803 B2 | 11/2015 | Patel |
| 9,225,647 B2 | 12/2015 | Manuguri |
| 9,230,001 B2 | 1/2016 | Magdon-Ismail |
| 9,325,495 B2 | 4/2016 | Roberts |
| 9,379,891 B2 | 6/2016 | Yoon |
| 9,383,969 B2 | 7/2016 | Van Der Sluis |
| 9,432,258 B2 | 8/2016 | Van Der Merwe |
| 9,473,574 B2 | 10/2016 | Vandwalle |
| 9,712,421 B2 | 7/2017 | Dolson |
| 9,736,111 B2 | 8/2017 | Lopez Da Silva |
| 9,860,195 B2 | 1/2018 | Javali |
| 9,876,759 B2 | 1/2018 | Ghai |
| 2002/0156987 A1 | 10/2002 | Gajjar |
| 2002/0166056 A1 | 11/2002 | Johnson |
| 2003/0070070 A1 | 4/2003 | Yeager |
| 2003/0081607 A1 | 5/2003 | Kavanagh |
| 2003/0133443 A1 | 7/2003 | Klinker |
| 2003/0147536 A1 | 8/2003 | Andivahis |
| 2004/0034776 A1 | 2/2004 | Fernando |
| 2004/0034778 A1 | 2/2004 | Celik |
| 2004/0042416 A1 | 3/2004 | Ngo |
| 2004/0064688 A1 | 4/2004 | Jacobs |
| 2004/0067761 A1 | 4/2004 | Pyhalammi |
| 2004/0083297 A1 | 4/2004 | Gazzetta |
| 2004/0196978 A1 | 10/2004 | Godfrey |
| 2004/0213179 A1 | 10/2004 | Lundin |
| 2004/0264405 A1 | 12/2004 | MacGregor |
| 2004/0266397 A1 | 12/2004 | Smith |
| 2005/0053068 A1 | 3/2005 | Toth |
| 2005/0094651 A1 | 5/2005 | Lutz |
| 2005/0120160 A1 | 6/2005 | Plouffe |
| 2005/0259637 A1 | 11/2005 | Chu |
| 2006/0046714 A1 | 3/2006 | Kalavade |
| 2006/0059091 A1 | 3/2006 | Wang |
| 2006/0204007 A1 | 9/2006 | Doetzkies |
| 2006/0224883 A1 | 10/2006 | Khosravi |
| 2006/0236092 A1 | 10/2006 | Hamalainen |
| 2007/0006296 A1 | 1/2007 | Nakhjiri |
| 2007/0087756 A1 | 4/2007 | Hoffberg |
| 2007/0100981 A1 | 5/2007 | Adamczyk |
| 2007/0156632 A1 | 7/2007 | Wolff |
| 2008/0076425 A1 | 3/2008 | Khetawat |
| 2008/0089239 A1 | 4/2008 | Todd |
| 2008/0101345 A1 | 5/2008 | Suzuki |
| 2008/0107096 A1 | 5/2008 | Huang |
| 2008/0137825 A1* | 6/2008 | Yoon .................. H04M 3/2281 379/112.01 |
| 2008/0155278 A1 | 6/2008 | Carrico |
| 2008/0212782 A1 | 9/2008 | Brettle |
| 2008/0279381 A1 | 11/2008 | Narendra |
| 2008/0285452 A1 | 11/2008 | Oran |
| 2009/0060175 A1 | 3/2009 | Schneider |
| 2009/0088147 A1 | 4/2009 | Bu |
| 2009/0259532 A1 | 10/2009 | Bergstraesser |
| 2009/0287922 A1 | 11/2009 | Herwono |
| 2009/0305688 A1 | 12/2009 | Bonnet |
| 2010/0039993 A1 | 2/2010 | Ramankutty |
| 2010/0086119 A1 | 4/2010 | De Luca |
| 2010/0125855 A1 | 5/2010 | Ferwerda |
| 2010/0174907 A1 | 7/2010 | Semple |
| 2010/0246500 A1 | 9/2010 | Rydnell |
| 2011/0016399 A1 | 1/2011 | Yasrebi |
| 2011/0040706 A1 | 2/2011 | Sen |
| 2011/0040858 A1 | 2/2011 | Gum |
| 2011/0069663 A1 | 3/2011 | Shu |
| 2011/0075675 A1 | 3/2011 | Koodli |
| 2011/0141947 A1 | 6/2011 | Li |
| 2011/0154022 A1* | 6/2011 | Cheng .................. H04L 63/062 713/154 |
| 2011/0170545 A1 | 7/2011 | Zheng |
| 2011/0182183 A1 | 7/2011 | Perkins |
| 2011/0191469 A1 | 8/2011 | Oran |
| 2011/0216646 A1 | 9/2011 | Flinta |
| 2011/0219123 A1 | 9/2011 | Yang |
| 2011/0264906 A1 | 10/2011 | Pourzandi |
| 2011/0268121 A1 | 11/2011 | Karino |
| 2011/0320592 A1 | 12/2011 | Kemmerer |
| 2012/0030683 A1 | 2/2012 | Kurdi |
| 2012/0084288 A1 | 4/2012 | Abdul-Razzak et al. |
| 2012/0120788 A1 | 5/2012 | Hu |
| 2012/0191860 A1 | 7/2012 | Traversat |
| 2012/0198241 A1 | 8/2012 | O'Hare et al. |
| 2012/0297087 A1 | 11/2012 | Humble |
| 2012/0314854 A1 | 12/2012 | Waters |

(56) References Cited

U.S. PATENT DOCUMENTS

| | | |
|---|---|---|
| 2012/0331298 A1 | 12/2012 | Xu |
| 2013/0042112 A1 | 2/2013 | Spector |
| 2013/0080586 A1* | 3/2013 | Attanasio ............... H04L 63/06 709/217 |
| 2013/0084896 A1 | 4/2013 | Barkie |
| 2013/0091526 A1 | 4/2013 | Iyer |
| 2013/0128886 A1 | 5/2013 | Shah |
| 2013/0132501 A1 | 5/2013 | Vandwalle |
| 2013/0137399 A1 | 5/2013 | Bari |
| 2013/0159715 A1 | 6/2013 | Klassen |
| 2013/0160080 A1 | 6/2013 | Shin |
| 2013/0160097 A1 | 6/2013 | Dowlatkhah |
| 2013/0219045 A1 | 8/2013 | Agarwal |
| 2013/0250771 A1 | 9/2013 | Yu |
| 2013/0254853 A1 | 9/2013 | Chaturvedi |
| 2013/0283060 A1 | 10/2013 | Kulkarni |
| 2013/0301627 A1 | 11/2013 | Chen |
| 2013/0329725 A1 | 12/2013 | Nakil |
| 2013/0343388 A1 | 12/2013 | Stroud |
| 2013/0346629 A1 | 12/2013 | Wang |
| 2014/0032753 A1 | 1/2014 | Watanabe |
| 2014/0040338 A1 | 2/2014 | Van Der Sluis |
| 2014/0040975 A1 | 2/2014 | Raleigh |
| 2014/0047439 A1 | 2/2014 | Levy |
| 2014/0129728 A1 | 5/2014 | Alex |
| 2014/0181933 A1 | 6/2014 | Sanjeev |
| 2014/0192976 A1 | 7/2014 | Yoon |
| 2014/0199962 A1 | 7/2014 | Mohammed |
| 2014/0226478 A1 | 8/2014 | Manuguri |
| 2014/0241169 A1 | 8/2014 | Collins |
| 2014/0245014 A1 | 8/2014 | Tuck |
| 2014/0274000 A1 | 9/2014 | Gosselin |
| 2014/0286337 A1 | 9/2014 | Dolson |
| 2014/0301258 A1 | 10/2014 | Belghoul |
| 2014/0331175 A1 | 11/2014 | Mesguich Havilio |
| 2014/0344908 A1 | 11/2014 | Rizzo |
| 2014/0348044 A1 | 11/2014 | Narayanan |
| 2014/0355520 A1 | 12/2014 | Wallis |
| 2015/0058876 A1 | 2/2015 | Gasnier |
| 2015/0065125 A1 | 3/2015 | Patel |
| 2015/0139230 A1 | 5/2015 | Zha |
| 2015/0148007 A1 | 5/2015 | Mitchell |
| 2015/0188919 A1 | 7/2015 | Belton |
| 2015/0256338 A1 | 9/2015 | Roberts |
| 2015/0281940 A1 | 10/2015 | Yu |
| 2015/0304275 A1 | 10/2015 | Ghai |
| 2015/0372973 A1 | 12/2015 | Lopez Da Silva |
| 2016/0072766 A1 | 3/2016 | Jain |
| 2016/0359798 A1 | 12/2016 | Choquette |
| 2017/0195256 A1 | 7/2017 | Javali |
| 2017/0250944 A1 | 8/2017 | Hong |
| 2017/0373961 A1 | 12/2017 | Dolson |
| 2018/0034770 A1 | 2/2018 | Rajagopalan |

FOREIGN PATENT DOCUMENTS

| | | |
|---|---|---|
| EP | 1587249 | 10/2005 |
| EP | 1837815 | 9/2007 |
| EP | 1993257 | 11/2008 |
| WO | 2007004938 | 1/2007 |
| WO | 2009103340 | 8/2009 |
| WO | 2013035051 | 3/2013 |
| WO | 2014018425 | 1/2014 |
| WO | 2015066930 | 5/2015 |

OTHER PUBLICATIONS

Antopolis, Sophia, Universal Mobile Telecommunications System (UMTS) LTE; 3G security; Lawful Interception architecture and functions, version 10.4.0., Jun. 1, 2011.

Antopolis, Sophia, "Lawful Interception (LI); Retained Data; Requirements of Law Enforcement Agencies for handling Retained Data", ETSI Draft; Jan. 27, 2009.

International Search Report dated Jul. 8, 2015 in corresponding PCT Application No. PCT/US2015/016961 filed Feb. 20, 2015, inventor(s) Grootwassink, David, et al. cited by applicant.

International Search Report dated May 21, 2015 in corresponding PCT Application No. PCT/US2015/15490 filed Feb. 11, 2015, inventor Puri, Rajesh et al.

Written Opinion of the International Searching Authority dated May 21, 2015, issued in International Application No. PCT/US2015/015490. cited by applicant.

International Search Report dated Oct. 30, 2015, issued in International Application No. PCT/US2015/023626 filed Mar. 31, 2015, inventor, Grootwassink, David et al.

Written Opinion of the International Searching Authority dated Oct. 30, 2015, issued in International Application No. PCT/US2015/023626. cited by applicant.

Arnedo-Moreno et al, JXTA resource access control by means of advertisement encryption, Future Generation computer Systems 26 (2009) pp. 21-28, Elsevier.

Ford et al., Peer-to-Peer Communication Across Network Address Translators, 2005, Usenix. cited by applicant.

Written Opinion of the International Searching Authority dated Jul. 8, 2015, issued in International Application No. PCT/US2015/016961. cited by applicant.

International Search Report dated Feb. 2, 2016, issued in International Application No. PCT/US2015/054957 filed Oct. 9, 2015, inventor Hammer, Michael et al.

Written Opinion of the International Searching Authority dated Feb. 2, 2016, issued in International Application No. PCT/US2015/054957. cited by applicant.

International Search Report dated Jan. 28, 2016, issued in International Application No. PCT/US2015/061976 filed Nov. 20, 2015, inventor Puri, Rajesh et al.

Written Opinion of the International Searching Authority dated Jan. 28, 2016, issued in International Application No. PCT/US2015/061976. cited by applicant.

International Search Report dated Jun. 22, 2015, issued in International Application No. PCT/US2015/20755 filed Mar. 16, 2015, inventor Puri, Rajesh et al.

Written Opinion of the International Searching Authority dated Jun. 22, 2015, issued in International Application No. PCT/US2015/020755 cited by applicant.

International Search Report dated Jul. 29, 2016, issued in International Application No. PCT/US2016/030311 filed Apr. 29, 2016, inventor Hammer, Michael et al.

Written Opinion of the International Searching Authority dated Jul. 29, 2016, issued in International Application No. PCT/US2016/030311 cited by applicant.

International Search Report dated Jan. 30, 2017, issued in International Application No. PCT/US2016/061894. cited by applicant.

Written Opinion of the International Searching Authority dated Jan. 30, 2017, issued in International Application No. PCT/US2016/061894 cited by applicant.

International Search Report dated Feb. 3, 2017, issued in International Application No. PCT/US2016/061897 filed Nov. 14, 2016, inventor Hammer, Michael et al.

Written Opinion of the International Searching Authority dated Feb. 3, 2017, issued in International Application No. PCT/US2016/061897. cited by applicant.

Extended European Search Report dated Feb. 16, 2018 in corresponding EP Application No. 15749222.4 filed Sep. 12, 2016, inventor Grootwassink, David et al.

International Search Report dated Apr. 25, 2017, issued in International Application No. PCT/US2017/17560 filed Feb. 10, 2017, inventor Hammer, Michael et al.

Supplementary European Search Report dated Feb. 5, 2018 in corresponding EP Application No. 15751839.0 filed Sep. 21, 2016, inventor Grootwassink, David et al.

* cited by examiner

METHOD AND SYSTEM FOR METADATA ANALYSIS AND COLLECTION WITH PRIVACY

CROSS REFERENCES

This application claims the benefit of and priority to U.S. Provisional Application No. 61/938,685, filed on Feb. 11, 2014, entitled "Method and System for Metadata Analysis and Collection with Privacy," the disclosure of which is hereby incorporated by reference in its entirety.

FIELD

The field of the present disclosure generally relates to secure network communications, more particularly, to a system and method for providing metadata analysis and collection with privacy.

BACKGROUND

Recent news reports exposed that government agencies (GA) perform the analysis of network communications to uncover terrorist and criminal organizations through the communications and relationships among members of those organizations. Privacy advocates have raised concerns that the government agencies should not collect data from their citizens without probable cause, due process, and court authorization. They argue that private data collections suppress the freedom of speech, the freedom of the press, the freedom of religion, and other basic human rights through possible intimidation by government agencies.

Communications service providers (CSPs) may collect and retain communications data, billing records, and other business records that are related to user accounts in a normal course of providing services. Government agencies may ask the CSPs to preserve data to enable forensic analysis related to terrorist and criminal activities.

While the public generally trusts the CSPs to protect personal data, the public do not want personal data to be turned over to government agencies. The government agencies attempt to build a graph of activities by target organizations but they are hindered if they have to perform the analysis of personal data that is resident across hundreds to thousands of CSPs. The analysis of data at such a large scale would require a query on every new user identity/number, resulting in a massive amount of queries and round-trip-delays for each query.

The scaling problem for queries involving a large number of CSPs is further complicated because multiple agencies in multiple nations may request such queries. The number of links and the number of queries required in addition to the CSP's scaling problem burdens both the government agencies and the CSPs.

One of the available solutions to the CSP's scaling problem is to use a trusted third party (TTP) system. Depending on laws or policies of a country, TTP functions may be implemented in a GA system. The TTP system provides added visibility, auditability, and oversight to the overall data analysis and collection processes. However, centralizing the data at the TTP moves the privacy concerns from the GA to the TTP. There remains a challenge to centralize data analysis and collection at the TTP while making the metadata invisible to the TTP for privacy issues.

SUMMARY

A system and method for metadata analysis and collection with privacy is disclosed. According to one embodiment, a trusted third party (TTP) system generates and transmits authorization keys to a government agency (GA) system and a communication service provider (CSP) system. The TTP system receives index records referencing records of subscribers from the CSP system and ingests the index records received from the CSP system. The TTP system receives a target index request from the GA system and sends a metadata record request to the CSP system based on the target index request. The CSP system sends metadata records to the TTP system, and the TTP system delivers the metadata records to the GA system. The metadata records are encrypted with encryption keys shared between the GA system and the CSP system such that the TTP system cannot decrypt the metadata records.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A system and method for metadata analysis and collection with privacy is disclosed. According to one embodiment, a trusted third party (TTP) system generates and transmits authorization keys to a government agency (GA) system and a communication service provider (CSP) system. The TTP system receives index records referencing records of subscribers from the CSP system and ingests the index records received from the CSP system. The TTP system receives a target index request from the GA system and sends a metadata record request to the CSP system based on the target index request. The CSP system sends metadata records to the TTP system, and the TTP system delivers the metadata records to the GA system. The metadata records are encrypted with encryption keys shared between the GA system and the CSP system such that the TTP system cannot decrypt the metadata records.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a detachable frame for a mobile computer. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

The present disclosure addresses both the privacy and scaling issues associated with centralizing data at a trusted third party (TTP). The present disclosure minimizes metadata shared between communications service providers (CSPs) and government agencies (GAs) and preserves the confidentiality of the shared metadata.

Figure 1:
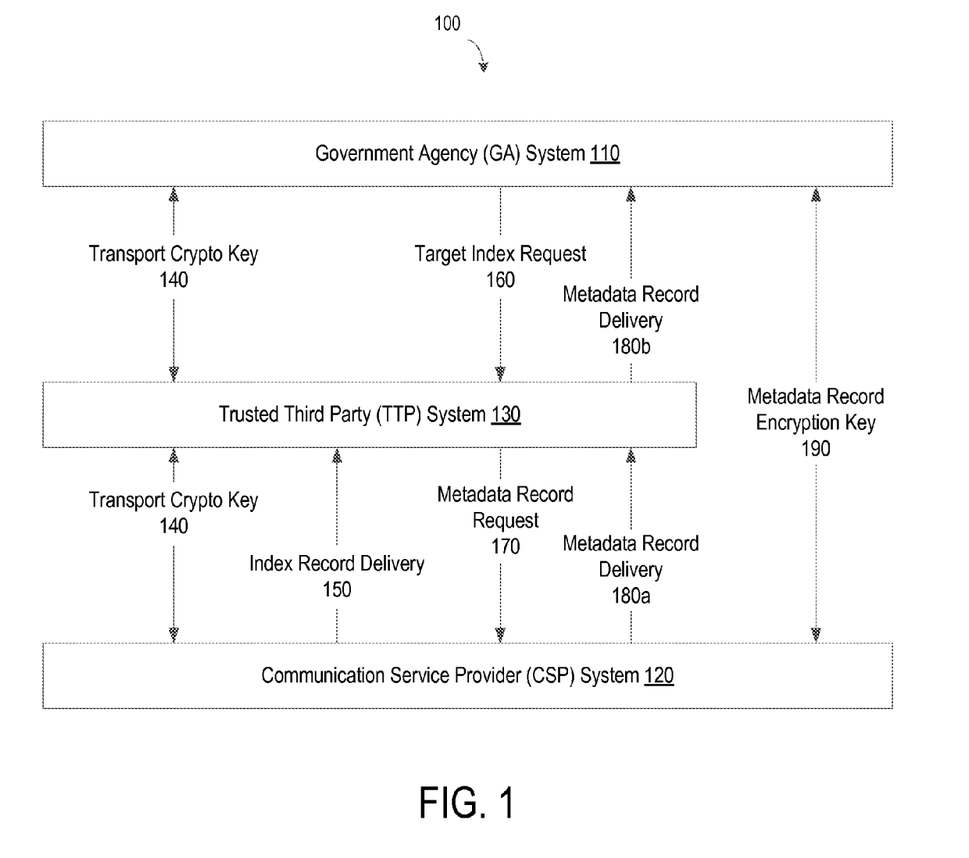
FIG. 1 illustrates a schematic diagram of an exemplary system for providing metadata analysis and collection with privacy, according to one embodiment.

FIG. 1 illustrates a schematic diagram of an exemplary system for providing metadata analysis and collection with privacy, according to one embodiment. The system 100 includes a government agency (GA) system 110, a communications service provider (CSP) system 120, and a trusted third party (TTP) system 130. The system 100 may include a plurality of GA systems, a plurality of CSP systems, and a plurality of TTP systems. The GA system 110, the CSP system 120, and the TTP system 130 shown in FIGS. 1-4 may represent one or more GA systems, CSP systems, and TTP systems, respectively. For example, the TTP systems may include different types of TTP instances, for example, telephony, email, Internet service provider (ISP), social media services, and other internet applications. Those instances might be operated by the same or different organizations or different parties.

According to one embodiment, a GA operates the GA system 110, a TTP operates the TTP system 130, and a CSP operates the CSP system 120. According to another embodiment, a GA operates the GA system 110 and the TTP system 130, while a CSP operates the CSP system 120 depending on laws or policies of a country. In this case, the GA operates the TTP instances implemented by the TTP system 130 and directly communicates with the CSP system 120. According to another embodiment, a GA operates the GA system 110, and a CSP operates the CSP system 120 and the TTP system 130. In this case, the CSP operates the TTP instances implemented by the TTP system 130 and directly communicates with the GA system 110. According to yet another embodiment, a GA operates all of the GA system 110, the TTP system 130, and the CSP system 120.

More than one GA system 110 may request information from multiple CSP systems 120. The TTP system 130 provides a scalable and privacy supporting model and reduces the amount of transported data from the CSP system 120 to the requesting GA system 110. The system 100 as a whole performs metadata analysis and collection, and requests and responses are transported among the GA system 110, the CSP system 120, and the TTP system 130 via communications flows. The communications flows include transport crypto key 140, index record delivery 150, target index request 160, metadata record request 170, metadata record delivery 180a and 180b, and metadata record encryption key 190. The transport crypto key 140 herein may refer to any cryptological material including, but not limited to, credentials used to generate or share keys to secure communication flows and storage at any level. The cryptological material may provide security at link, IP, transport, or application levels as possible alternatives.

To establish secure communications for analyzing and collecting metadata records between the GA system 120 and the CSP system 130, the TTP system 130 generates transport crypto keys and sends the keys to the GA system 110 and the CSP system 120 via the transport crypto key 140. The transport crypto key 140 manages credentials and keys for metadata analysis and collection between the TTP system 130 and the GA system 110, and between the TTP system 130 and the CSP system 120. The transport crypto key 140 may be an asymmetric key or a symmetric key. The communication flows among the GA system 110, the CSP system 120, and the TTP system 130 are encrypted such that no other parties can gain access to private information of subscribers of the CSP system 120. Examples of data in the communication flow of the transport crypto key 140 include, but are not limited to, certificates and keys used to secure the subsequent communication flows 150-180 such as layer 2 secure links, layer 3 Internet protocol security (IPsec) tunnels, TLS connection, or a message or an application payer payload encryption.

Separately from the transport crypto key 140, the CSP system 120 directly delivers the metadata record encryption key 190 to the GA system 110 without going through the TTP system 130. The metadata record encryption key 190 is established outside of the TTP system 130 and used for the GA system 110 to decrypt the encrypted metadata record received from the CSP system 120. The communication flows are opaque to the TTP system 130, and the TTP system 130 cannot decrypt the metadata records exchanged between the GA system 110 and the CSP system 120 because it does not have the metadata record encrypting key 190.

The CSP system 120 delivers index records to the TTP system 130. The index records references records of subscribers of the CSP system 120. The index records of the CSP system 120 may be stored in a data center. According to one embodiment, the index record delivery 150 is a continuous process including a constant flow of data packets. The TTP system 130 stores the index records in a storage device. The GA system 110 sends a target index request 160 to the TTP system 130 for identifying activities and records of a target ID. In response to the target index request 160, the TTP system 130 performs analysis on the stored index records. After performing the analysis on the stored index records, the TTP system 130 sends a metadata record request 170 to the CSP system 120 that stores records of the target identity. In response, the CSP system 120 delivers a collection of minimized and encrypted metadata records to the TTP system 130 via the communication flow 180a, and the TTP system 130 passes the metadata records to the GA system 110 via the communication flow 180b.

According to one embodiment, the TTP system 130 acts on behalf of the GA system 110 to send the target index request 160 to other TTP system and aggregate a response back to the original GA system 110. In this case, the TTP system 130 acting as the GA system 110 may through crypto relationships need to re-encrypt before sending the response from other TTP systems to the GA system 110. Otherwise, the crypto relationship of the secondary TTP systems and the GA system 110 remains intact and the primary TTP system 130 simply aggregates the metadata delivery records 180. In another embodiment, the TTP functionality is operated by a selected central CSP 120 that issues the metadata record request 170 to other CSP systems and aggregates encrypted records for delivery to the GA system 110.

Figure 2:
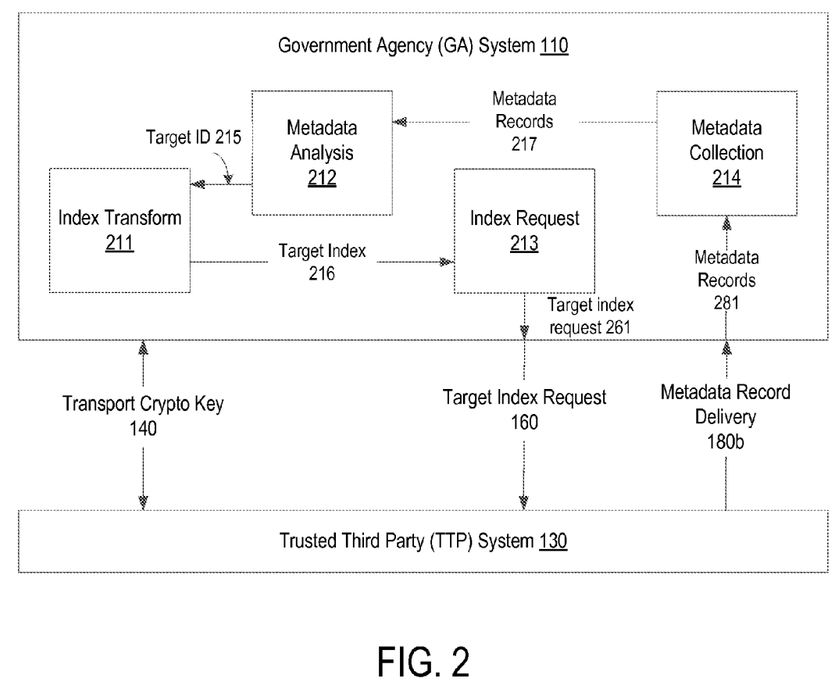
FIG. 2 illustrates communication flows between a GA system and a TTP system, according to one embodiment.

FIG. 2 illustrates communication flows between the GA system 110 and the TTP system 130, according to one embodiment. The GA system 110 includes various processes including an index transform process 211, a metadata analysis process 212, an index request process 213, and a metadata collection process 214. The metadata analysis process 212 represents law enforcement or intelligence investigative operations and forensics to determine a target ID 215 of a target (e.g., an individual, a group, an organization) of interest. The metadata analysis process 212 launches queries for the target ID 215 and consumes the query results received from the TTP system 130 via metadata record delivery flow 180b. The target ID 215 may be a telephone number, or a unique ID for the target of interest including, but not limited to, an IP address, an email address, an alias, a media access control (MAC) address, an international mobile subscriber identity (IMSI), an international mobile station equipment identity (IMEI), a credit card number, or a user name. The index transform process 211 receives the target ID 215 from the metadata analysis process 212 and encrypts the target ID 215 into a target index 216. According to one embodiment, the target index 216 is created using a cryptographic one-way hash function generated with an initialization vector input. Therefore, the target ID value is hidden to the TTP system 130 by the cryptographic transform function. The index request process 213 receives the target index 216 from the index transform process 211, packages a target index request 261 including the target index 216, and sends the target index request 261 to the TTP system 130 via the target index request 160.

The TTP system 130 delivers the metadata records 281 for the target index 216 to the metadata record collection process 214 via the metadata record delivery 180b. The metadata records 281 are encrypted by the CSP system 120 using the metadata record encryption key 190 as discussed in the example shown in FIG. 1. The metadata collection process 214 decrypts the encrypted metadata records 281 and sends the decrypted metadata records 217 to the metadata analysis process 212. The metadata collection process 214 may send the decrypted metadata records 217 to the metadata analysis process 212 in a batch or a stream of data packets.

Figure 3:
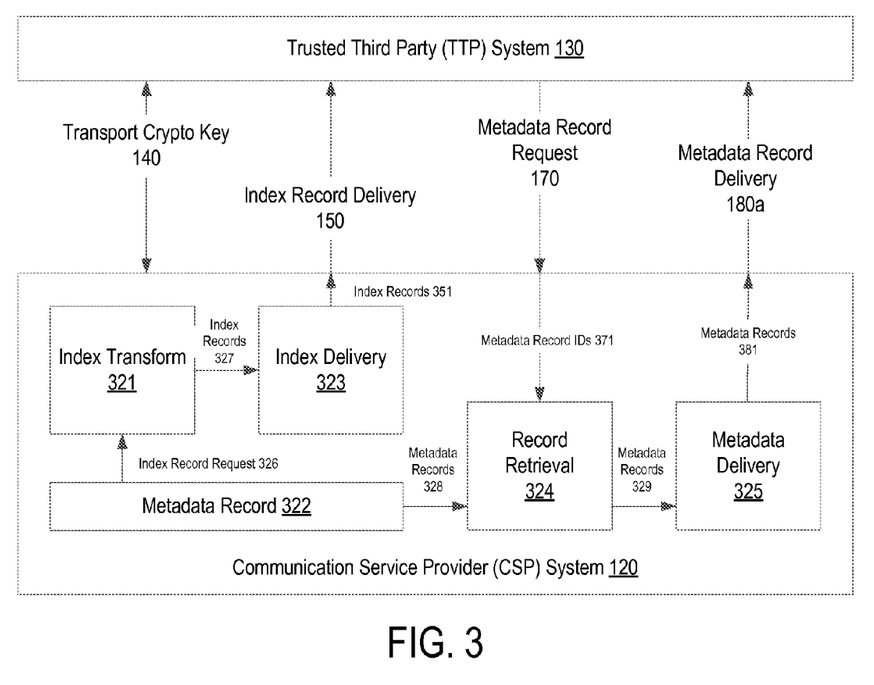
FIG. 3 illustrates communication flows between a TTP system and a CSP system, according to one embodiment.

FIG. 3 illustrates communication flows between the TTP system 130 and the CSP system 120, according to one embodiment. The CSP system 120 includes an index transform process 321, a metadata record process 322, an index delivery process 323, a record retrieval process 324, and a metadata delivery process 325. The metadata record process 322 sends an index record request 326 to the index transform process 321. Using the index record request 326 received from the metadata record process 322, the index transform process 321 produces index records 327 and sends the index records 327 to the index delivery process 323. The index delivery process 323 delivers the index records 351 to the TTP system 130 via the index record delivery 150. The index records 351 include indexed records of the subscribers of the CSP system 120. The index records 351 may also include identifiers of multiple parties, for example, telephone numbers involved in a 2-way, 3-way or a conference call. Each of such multiple party index records may have multiple indexes. In one embodiment, the index records 351 include a reference to a full record that can be later retrieved by the record retrieval process 324.

The records retrieval process 324 receives a metadata record request 170 including metadata record ID 371 from the TTP system 130 and pulls metadata records 328 from the metadata record process 322. For example, the metadata record request 170 may include several metadata record IDs 371. The record retrieval process 324 compiles the associated metadata records 328 as indicated by the metadata record IDs 371 and pushes the metadata record report 329 to the metadata delivery process 325. It is noted that the metadata record request 170 is a single request but can include a list of metadata record IDs 371. The metadata delivery process 325 encrypts the metadata records 329 to produce encrypted metadata records 381, and sends the metadata record 381 to the TTP system 130 via metadata record delivery 180a. The responses from the CSP system 120 for the metadata records may be broken into a series of messages or compiled in a single file. The delivery of the metadata records 381 from the CSP system 120 to the TTP system 130 may depend on the data transmission mechanism and the mutually agreed delivery process (e.g., a batch delivery, streamed delivery) between the TTP system 130 and the CSP system 120.

Figure 4:
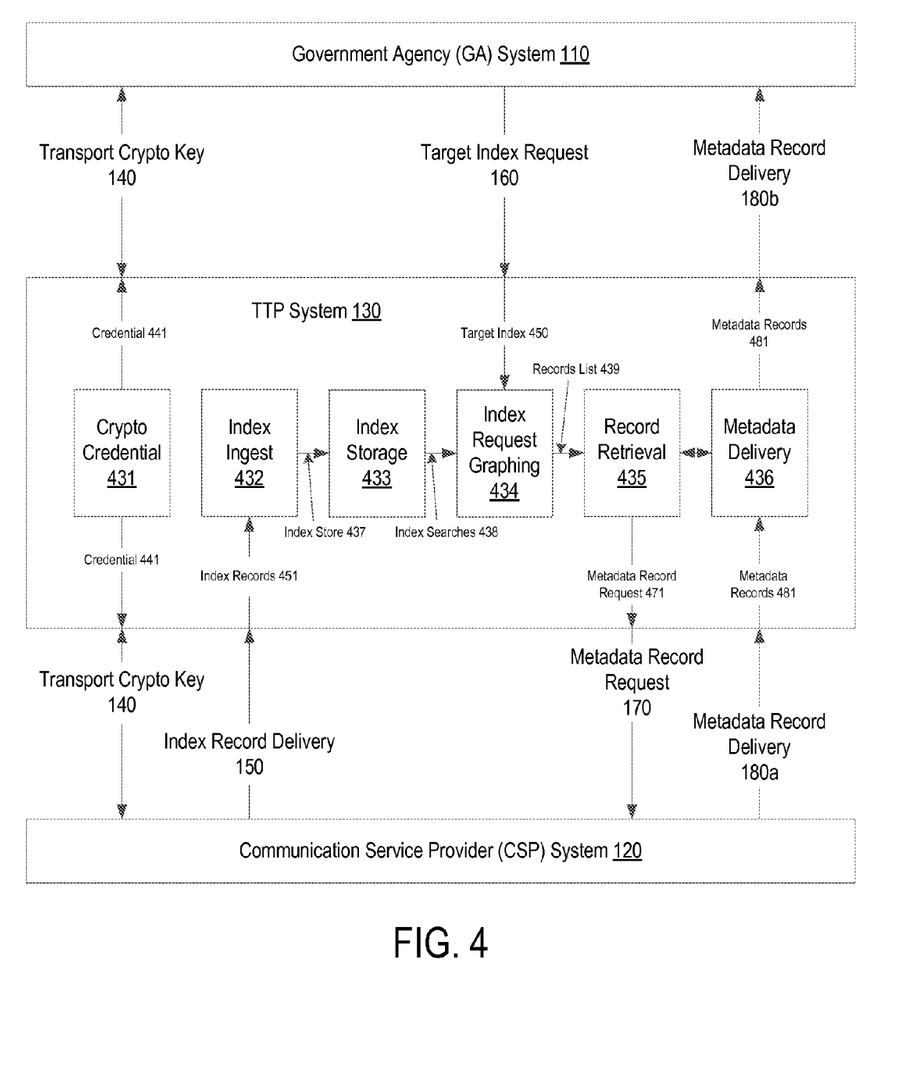
FIG. 4 illustrates communication flows within a TTP system, according to one embodiment.

FIG. 4 illustrates communication flows within the TTP system 130, according to one embodiment. The TTP system 130 includes a crypto credential process 431, an index ingest process 432, an index storage process 433, an index request graphing process 434, a record retrieval process 435, and a metadata delivery process 436. The crypto credential process 431 supports secure authenticated transmissions of credentials 441 to an authorized GA system 110 and the participating CSP system(s) 120. According to one embodiment, the crypto credential process 431 receives the credentials 441 from another certificate authority and sends the received credentials 441 to the GA system 110 and the CSP systems 120. The index ingest process 432 manages the receipt and organization of a sequence of index records 451 received from the CSP system 120. The index storage process 433 keeps the index record 437 for a predetermined retention time. The retention time may be proscribed by law and enforced by the government.

The index request graphing process 434 searches on a target index 450 received from the GA system 110 via target index request 160, compiles matching index records 438 to create metadata record list 439, and sends the metadata record list 439 to the record retrieval process 435. For example, the index request graphing process 434 creates a relational graph of the target(s) identified by the target index 450. The relational graph shows the relationships of a target with other targets that are within a predetermined number of hops. The index request graphing process 434 searches for the appearance of the target(s) in the index store 437 and pulls the matching records 438 from the index storage process 433. In the case of telephony TTP, the target index may be an originator (i.e., caller), a destination (i.e., callee) in a call, or may forward a call or play a role associated with the call. Other parties of an initial match hit are used as target indexes for a subsequent search. The index search may be performed in several iterations, and the number of iterations may vary depending on the national regulatory limits. For example, in a first iteration, the index request graphing process 434 pulls indexes of the target index 450. In a second iteration, the index request graphing process 434 pulls indexes of the target indexes that are one hop away from the target index 450. In subsequent iterations, more target indexes that are within a predetermined number of hops from the initial target index are pulled. The record retrieval process 435 may also indicate to the CSP system 120 to include as yet unindexed records associated with the target index 450 and associates, and sends a metadata record request 471 to the CSP system 120. Each of the CSP system 120 that includes the metadata records for the target ID receives the metadata record request 170. The metadata delivery process 436 receives and aggregates encrypted metadata records 481 from the CSP system 120. The aggregation of encrypted metadata records 481 may occur in a batch or in streams. The metadata delivery process 436 ensures that the encrypted metadata records 481 from the CSP system 120 are returned to the GA system 110. If a response received from a CSP system 120 is partial or incomplete, the metadata delivery process 436 may request that the record retrieval process 435 re-generates the metadata record request 170 and provide it to the CSP system 120.

The communication flows 140-180 further include a coordination flow between each GA system 110 and each CSP system 120 for delivering encryption keys to protect the metadata records that are tunneled through the TTP system 130. While it is possible to use a full-mesh model (i.e., allowing each GA system 110 to communicate with each CSP system 120) for the delivery of metadata records 481 from a CSP system 120 to a GA system 110, the present system may adopt a hub and spoke model to allow the TTP system 130 to correlate and audit the correlation between target index requests, metadata record requests, and metadata record delivery. The delivery of metadata records 481 through the TTP system 130 provides assurance to auditors. It is noted that the present system minimizes the number of requests from the GA system 110 to the CSP system 120 by correlating and auditing the requests for and delivery of metadata using the TTP system 130. In a full-mesh model, each request by a GA system 110 may have to send a series of requests to multiple CSP systems 120 to be able to retrieve metadata records for a target of interest. The present system allows a GA system 110 to receive a single response from each CSP system 120 instead of exchanging multiple requests and responses.

Figure 5:
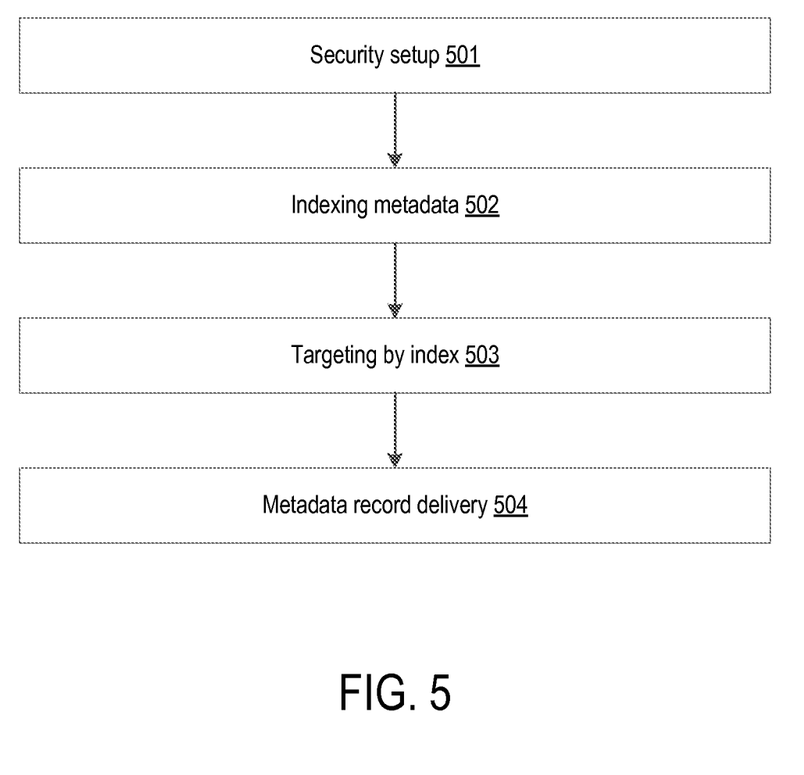
FIG. 5 illustrates an exemplary process flowchart for metadata analysis and collection, according to one embodiment.

FIG. 5 illustrates an exemplary process flowchart for metadata analysis and collection, according to one embodiment. The analysis and collection of requested metadata by a GA 120 is performed in four phases, security setup 501, indexing of metadata 502, targeting by index 503, and metadata record delivery 504.

In the security setup phase 501, credentials (e.g., transport crypto key 140 shown in FIG. 1) are passed between the TTP system 130 and the GA system 110, and between the TTP system 130 and the CSP system 120 to establish credentials for secure delivery of data requests and responses. The transport crypto key 140 may represent a series of messages going back and forth to build and issue a certificate between two parties (e.g., between the TTP system 130 and the GA system 110 and between the TTP system 130 and the CSP system 120). The established credentials allow for secure transport of legally authorized and retained data from the TTP system 130 to the requesting GA system 110. Separately, the GA system 110 and the CSP system 120 directly exchange credentials (e.g., metadata record encryption keys 190 shown in FIG. 1) to secure delivery of metadata records end-to-end from the CSP system 120 to the GA system 110 without going through the TTP system 130. In one embodiment, public key infrastructure (PKI)-based certificates and mechanisms are used for authentication and authorization. For example, the present system uses symmetric keys and delivers a high volume of index and metadata records to the CSP system 120, the TTP system 130, and the GA system 110.

The CSP system 120 determines which business records to keep as metadata records (e.g., call detail records, emails, messages). Depending on the regulation and requests by the GAs 110, the CSP system 120 may add/delete/modify/retain metadata records. During the indexing of metadata phase 502, the CSP system 120 prepares the metadata records including records required by the GA system 110. For example, the CSP system 120 generates index records that contain hashes of the target IDs along with a globally unique record number (e.g., universally unique identifier (UUID)) and a timestamp to help manage the data retention duration. The CSP system 120 delivers the index records to the TTP system 130. It is noted that the delivery of the index records may not occur in a batch. Instead, the delivery of the index record may occur in a continuous process as business records are created in the CSP system 120. The TTP system 130 ingests a stream of index records received from multiple CSP systems 120 and stores the ingested stream of records in a high-volume data center for later search and retrieval.

During the targeting by index phase 503, the GA system 110 transforms requests for records related to target IDs into requests for target indexes using a hash function or indexing keys of the CSP system 120. Both the CSP system 120 and the GA system 110 perform the same transformation: hash using defined inputs (e.g., identity, initial vector), output index value, etc. From the index value, the TTP system 130 cannot discover a particular target identity, but can compare index values to determine whether they are the same or different. The GA system 110 delivers the target index to the TTP system 130 along with a request authorization document that is stored and managed by the GA system 110 for request handling and auditing purposes. Using the target index received from the GA system 110, the TTP system 130 performs searches for the target index across the index information provided by multiple CSP system 120. The TTP system 130 also performs additional searches on the hashed identity of associates (e.g., other parties found in the searches) found in the index records that contain the target-hashed identity. If permitted or requested by the GA system 110, the associates may be searched in an iterative process beyond the initial search. The TTP system 130 produces a list of UUIDs that map back to the metadata records of each CSP system 120. The TTP system 130 sends metadata record requests to the CSP system 120 that keeps the requested records for the UUIDs of interest. The CSP system 120 sends the metadata records to the GA system 110 along with the request authorization document.

During the metadata record delivery phase 504, the CSP system 120 encrypts the metadata records using symmetric keys shared with the requesting GA system 110 and delivers the metadata records encapsulated with the request authorization information to the TTP system 130. The TTP system 130 forwards the metadata record to the GA system 110. The TTP system 130 does not have visibility into the content of the metadata records because the TTP system 130 does not have the symmetric keys to decrypt the encrypted metadata records. However, the TTP system 130 can document the volume of metadata records that are needed to fulfill the request by the GA system 110.

Figure 6:
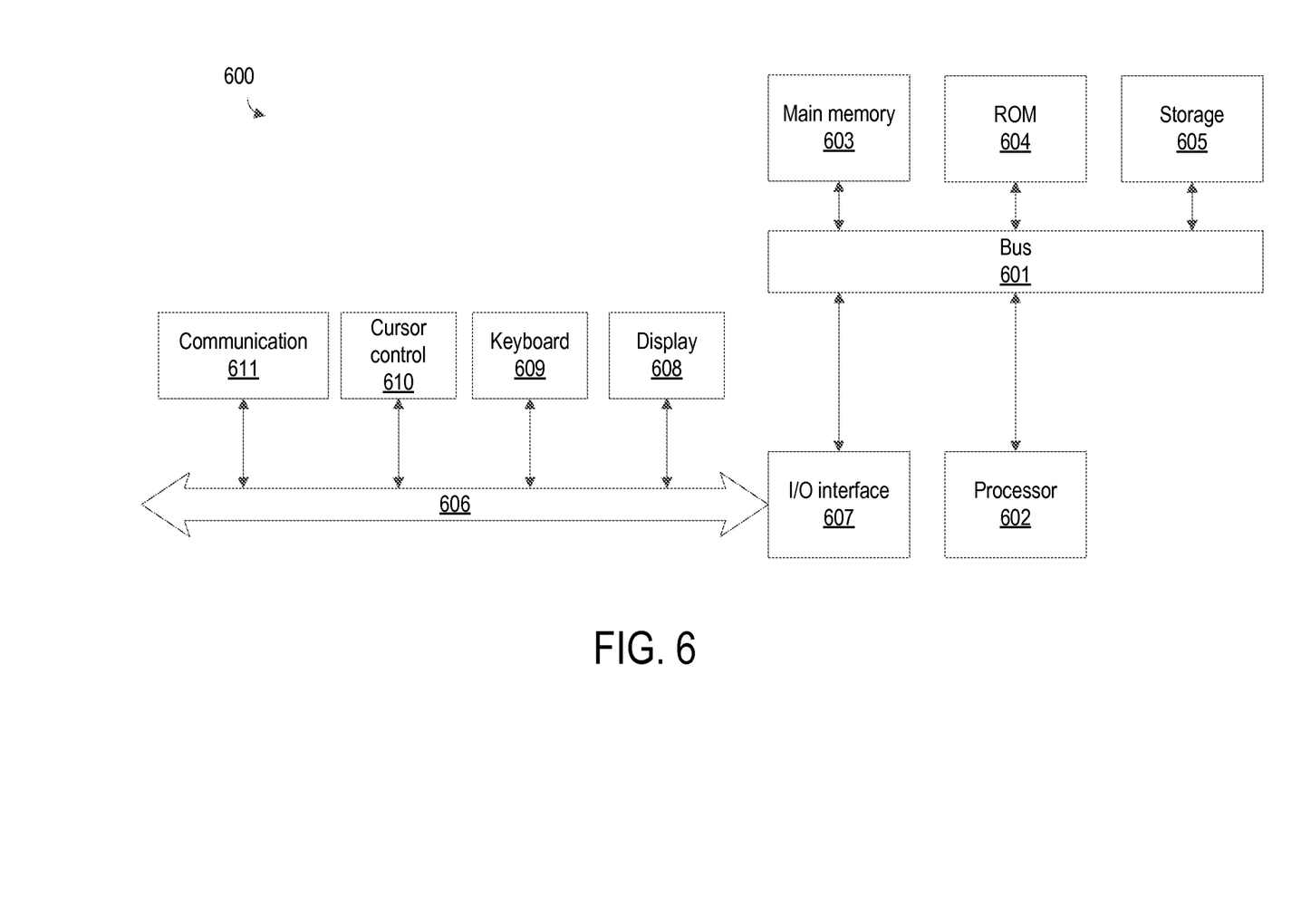
FIG. 6 illustrates an exemplary computer architecture that may be used for the present system, according to one embodiment.

FIG. 6 illustrates an exemplary computer architecture that may be used for the present system, according to one embodiment. The exemplary computer architecture may be used for implementing one or more components described in the present disclosure including, but not limited to, the present content curation system. One embodiment of architecture 600 includes a system bus 601 for communicating information, and a processor 602 coupled to bus 601 for processing information. Architecture 600 further includes a random access memory (RAM) or other dynamic storage device 603 (referred to herein as main memory), coupled to bus 601 for storing information and instructions to be executed by processor 602. Main memory 603 also may be used for storing temporary variables or other intermediate information during execution of instructions by processor 602. Architecture 600 may also include a read only memory (ROM) and/or other static storage device 604 coupled to bus 601 for storing static information and instructions used by processor 602.

A data storage device 605 such as a magnetic disk or optical disc and its corresponding drive may also be coupled to architecture 600 for storing information and instructions. Architecture 600 can also be coupled to a second I/O bus 606 via an I/O interface 607. A plurality of I/O devices may be coupled to I/O bus 606, including a display device 608, an input device (e.g., an alphanumeric input device 609 and/or a cursor control device 610).

The communication device 611 allows for access to other computers (e.g., servers or clients) via a network. The communication device 611 may include one or more modems, network interface cards, wireless network interfaces or other interface devices, such as those used for coupling to Ethernet, token ring, or other types of networks.

While some specific embodiments of the present disclosure have been shown, the present disclosure should not be interpreted to limit the scope of the present disclosure to these embodiments. For example, most functions performed by electronic hardware components may be duplicated by software emulation. Thus, a software program written to accomplish those same functions may emulate the functionality of the hardware components in input-output circuitry. The present disclosure is to be understood as not limited by the specific embodiments described herein, but only by scope of the appended claims.

Embodiments as described herein have significant advantages over previously developed implementations. As will be apparent to one of ordinary skill in the art, other similar apparatus arrangements are possible within the general scope. The embodiments described above are intended to be exemplary rather than limiting, and the bounds should be determined from the claims.

What is claimed is:

1. A method comprising:
generating and transmitting authorization keys by a trusted third party (TTP) system to a government agency (GA) system and a communication service provider (CSP) system;
receiving index records from the CSP system,
wherein the index records reference records of subscribers of the CSP system;
ingesting and storing the index records received from the CSP system;
receiving a target index request from the GA system;
sending a metadata record request by the TTP system to the CSP system based on the target index request; and
receiving metadata records at the TTP system from the CSP system and sending the metadata records to the GA system,
wherein the metadata records are encrypted with encryption keys shared between the GA system and the CSP system, but not the TTP system such that the TTP system cannot decrypt the metadata records.

2. The method of claim 1, wherein the encryption keys are symmetric encryption keys shared between the GA system and the CSP system.

3. The method of claim 1, wherein the stream of index records includes a constant flow of data packets.

4. The method of claim 1, further comprising storing the index records in a data center.

5. The method of claim 1, further comprising performing analysis on the index records in response to the target index request.

6. The method of claim 1, wherein the target index request includes a target index that transforms the target ID using indexing keys.

7. The method of claim 6, wherein the target ID is a telephone number, an IP address, an email address, a media access control (MAC) address, an international mobile subscriber identity (IMSI), an international mobile station equipment identity (IMEI), a credit card number, or a user name.

8. The method of claim 1, further comprising searching a target index on the index records and gathering a metadata record identifier list.

9. The method of claim 8, wherein the metadata record identifier list includes an initial match hit of call records in which the target index acts as a caller or a callee, forwards a call to another party, or plays a role in the communication.

10. The method of claim 9, wherein the metadata record identifier list includes a second match hit of call records in which parties of the initial match hit are used as target indexes.

11. The method of claim 7, further comprising sending the metadata record request based on the metadata record identifier list.

12. The method of claim 1, further comprising determining that the metadata records received from the CSP system are partial or incomplete; and re-sending the metadata record request to the CSP system.

13. The method of claim 1, wherein the index records include identifiers from multiple parties.

14. The method of claim 13, wherein the identifiers from the multiple parties include telephone numbers.

15. The method of claim 1, wherein the index records include a reference to a full record.

16. A method comprising:
receiving authorization keys from a trusted third party (TTP) system, wherein the authorization keys are shared with a CSP system;
generating queries for a target ID;
transforming the target ID to a target index;
sending a target index request to a TTP system, wherein the TTP system sends a metadata record request to the CSP system, and wherein the CSP system delivers to the TTP system encrypted metadata records;
receiving the encrypted metadata records from the TTP system; and
decrypting the encrypted metadata records using an encryption key shared between a government agency (GA) system and the CSP system, but not the TTP system,
wherein the TTP system keeps track of a volume of the encrypted metadata records, and is incapable of decrypting the encrypted metadata records.

17. The method of claim 16, wherein the receiving encrypted metadata records further comprises receiving the encrypted metadata records in a batch.

18. The method of claim 16, wherein the receiving encrypted metadata records further comprises receiving the encrypted metadata records in a streams of data packets.

19. The method of claim 16, further comprising:
receiving a transport crypto key from the TTP system; and
encrypting the target index request using the transport crypto key.

20. A method comprising:
receiving authorization keys from a trusted third party (TTP) system, wherein the authorization keys are shared with a government agency (GA) system;
sending index records to the TTP system, wherein the index records reference records of subscribers;
receiving a metadata record request from the TTP system, wherein the metadata record request includes a metadata record ID;
retrieving metadata records that are associated with the metadata record ID from a metadata store;
generating encrypted metadata records by encrypting the metadata records using an encryption key shared between the GA system and a communication service provider (CSP) system, but not the TTP system such that the TTP system cannot decrypt the metadata records; and
sending the encrypted metadata records to the TTP system.

21. The method of claim 20, wherein the sending the encrypted metadata records to the TTP system further comprises sending the encrypted metadata records in a streams of data packets.

22. The method of claim 20, further comprising storing the encrypted metadata records in a data center.

* * * * *